United States Patent [19]

Grill et al.

[11] Patent Number: 5,580,670
[45] Date of Patent: Dec. 3, 1996

[54] HEAVILY THERMALLY STRESSABLE COMPONENT

[75] Inventors: Robert Grill, Reutte; Nikolaus Reheis, Jerzens; Michael Witwer, Burs, all of Austria

[73] Assignee: Schwarzkopf Technologies Corporation, New York, N.Y.

[21] Appl. No.: 432,138

[22] PCT Filed: Sep. 8, 1994

[86] PCT No.: PCT/EP94/03013

§ 371 Date: Jun. 12, 1995

§ 102(e) Date: Jun. 12, 1995

[87] PCT Pub. No.: WO95/07869

PCT Pub. Date: Mar. 23, 1995

[30] Foreign Application Priority Data

Sep. 14, 1993 [AU] Australia ................................. 1848/93

[51] Int. Cl.⁶ .......................... B32B 15/04; B32B 15/20; B32B 15/18
[52] U.S. Cl. ......................... 428/666; 428/610; 428/673; 428/675; 428/665; 428/663; 428/684
[58] Field of Search ................................. 428/610, 666, 428/675, 634, 673, 674, 665, 663, 684

[56] References Cited

U.S. PATENT DOCUMENTS

| 3,713,790 | 1/1973 | Takamori et al. | 29/195 |
| 4,350,744 | 9/1982 | Snitzer et al. | 428/630 |
| 4,358,512 | 11/1982 | Richter | 428/630 |
| 4,398,659 | 8/1983 | Richter | 228/124 |
| 4,428,523 | 1/1984 | Snitzer et al. | 228/121 |

OTHER PUBLICATIONS

Grant, Hackh's Chemical Dictionary, p. 452, 1977.

*Primary Examiner*—David A. Simmons
*Assistant Examiner*—Linda L. Gray
*Attorney, Agent, or Firm*—Morgan & Finnegan, L.L.P.

[57] ABSTRACT

A heavily thermally stressable component comprising a graphite and a metal part, e.g., copper or a copper alloy, soldered together. Between the solder and the metal part there is an intermediate layer comprising chromium or an alloy containing a substantial proportion of chromium with copper and/or nickel additives. This special intermediate layer provides a good bond between the graphite and the metal which remains stable even under the heaviest cyclic thermal stresses.

38 Claims, No Drawings

HEAVILY THERMALLY STRESSABLE COMPONENT

BACKGROUND OF THE INVENTION

The invention concerns a component with high heat load-carrying capacity, comprising at least one graphite part with at least, which parts are connected to each other by a layer of solder, wherein an intermediate layer is arranged between the metal part and the solder.

Because of graphite's special characteristics such as high heat load-carrying capacity, good heat conductivity and low rate of disintegration, it is very suitable for components which are subjected to high thermal stress. In these applications the graphite is used in a variety of forms, such as a polycrystalline graphite, pyrolitic graphite, or also as fiber-reinforced graphite. It is a disadvantage of graphite that, even in its fiber-reinforced form, it features only limited mechanical strength and ductility. For this reason graphite is often used only as a composite material in connection with metals, in order to fulfill all the requirements for that special application.

The soldering of graphite to suitable metallic materials—such as for instance copper, inconel, molybdenum or TZM—is known. Examples of suitable solders are, for instance, alloys of the elements Ag, Cu, Ni, Pt, Ti, Zr, Cr with a proportion of copper and titanium. The soldering is carried out in a vacuum, at temperatures which, depending on the solder, range between 850° C. and 1900° C.

Graphite/metal composite materials have proved their advantages in actively cooled heat shields, such as for instance in the production of components for the "first wall" or of diverters and limiters in the case of fusion reactors. In those applications the graphite part is soldered to cooling pipes such as those made of copper or molybdenum.

One of the problems in the case of all soldered composite materials made of graphite and metals is the great difference in the coefficient of thermal expansion, a difference which causes enormous stresses on the soldered connection between the different materials. Particularly in the case of cyclical thermal stresses, the soldered connection often does not resist the varying mechanical stresses that occur in such cases, so that major distortions, cracks in the material or even a complete failure of the component may occur.

Consequently, the past has been punctuated by numerous attempts to provide better matching between the differing thermal expansions of graphite and metals as used in soldered composite materials, or to reduce the mechanical stresses that occur, by inserting an intermediate layer.

For instance, JP 63-310778 describes a composite material produced by soldering, designed for high-temperature applications and made of graphite and metal, in which a single-layer intermediate layer of nickel is provided in order to reduce the mechanical stresses in the composite material.

AT-B-393 651 describes a composite body resistant to high temperatures made of a graphite part and a part consisting of molybdenum or a molybdenum alloy, the parts being connected to each other by a zirconium solder, wherein a two-layer intermediate layer made of vanadium and tungsten or tantalum or niobium is arranged between the molybdenum part and the solder. The intermediate layer is designed to prevent the formation of a eutectic between molybdenum and the zirconium solder, which eutectic would lower the maximum permissible usage temperature of the composite body.

DE-A1-2527326 describes a switching part for high-voltage power switches, in which the surface of the switching part, made of a high-melting metal, is connected to an electric-arc electrode made of graphite, via a layer of solder containing at least one carbide-forming metal. As an option one can arrange an intermediate layer made of a carbide-forming metal such as chromium, between the graphite electrode and the solder layer. In this manner, the wetting of the graphite—hence the strength of the solder connection—is to be improved. Over and above such an improvement, such an intermediate layer should go far to prevent an undesirable diffusion of carbon from the graphite into the solder material.

EP 0 296 942 also describes such a composite material for high-temperature applications in which there is arranged, between the parts to be connected, a foil made of a high-melting metal such as Mo, Ta, Hf, Zr, Nb or W and their alloys; as well as a foil made of Cu, Ti or Ni and their alloys. The soldering material is arranged between the parts to be connected and the foils, as well as between the two foils themselves. This type of connection yields components which provide for a good connection of the graphite and metal materials, in the case of uniform heat stresses. However, in the case of sharply cyclical thermal stresses—such as occur, for instance, in cooling elements for fusion reactors—this type of connection is not an optimum one and may lead to stress cracking in the material and/or to failure of the entire components.

SUMMARY OF THE INVENTION

It is an object of the present invention to create components made of a composite material from graphite and metal, which components have high heat load-carrying capacity and which insure—in particular including the case of markedly cyclic thermal stresses—an excellent connection of the individual parts.

This and other objects are achieved according to the invention in a manner such that the intermediate layer consists essentially of chromium or of an alloy containing a significant proportion of chromium with the addition of copper or nickel. By using such materials to produce the intermediate layer one ensures that the good connection of the graphite and metal materials is maintained, even in the case of the highest thermal cyclic stresses, without there occurring material cracks—even if the stress greatly exceeds 1000 cycles.

DETAILED DESCRIPTION OF THE INVENTION

The intermediate layer is applied onto the metal part by means of simple procedures such as plasma spraying or by the HIP treatment of a layer applied as a powder mix. Applying the intermediate layer in the form of a metal sheet or tube has also been found to work.

Well-suited intermediate layers are those consisting of a homogenous two-phase alloy containing at least 20 wt. % chromium, in particular 25 wt. % chromium, with the rest being essentially copper; or, of a homogenous alloy with at least 45 wt. % chromium, in particular 50 wt. % chromium, with the rest being essentially nickel.

It is particularly advantageous if the intermediate layer has a gradient-type structure—i.e., when the intermediate layer consisting of copper and chromium (or nickel and chromium) changes in its structure, namely starting from a zone of pure copper or nickel on the side adjoining the metal part, with a steady increase in the chromium percentage, up to a pure chromium zone on the other side (connected to the solder).

It was found to be advantageous if the intermediate layer featured a layer thickness between 0.5 mm and 2 mm.

For the graphite part a fiber-reinforced graphite proved to be particularly successful, while for the metal-part copper and/or copper alloys and steel, but also tungsten/copper or molybdenum/copper composite materials are eminently suitable. The alloy 70 Ag 27 Cu 3 Ti was found to be particularly recommendable as a soldering material for the above-mentioned composite material.

The invention will be explained in greater detail below in the following examples.

EXAMPLE 1

A diverter sample for fusion reactors according to the "monoblock design" was produced as follows:

A Cu pipe with an outside diameter of 15 mm, an inside diameter of 14 mm and a length of 200 mm was sandblasted on its external circumferential surface, cleaned with ultrasound and etched in diluted nitric acid. An intermediate layer 2 mm thick made of an alloy containing 50% chromium and 50% copper was applied onto the external peripheral surface of the Cu pipe by means of a vacuum/plasma spray procedure, following normally used spray conditions that had been adjusted for the special alloy.

Immediately thereafter the coated pipe surface was ground to a tolerance of +0.02 mm.

The Cu pipe prepared in this manner was inserted in a prismatic graphite part with the measurements 36×44×150 mm in a central bore with a diameter of 20 mm and was soldered with the use of a soldering material having the composition 70 Ag 27 Cu 3 Ti, at 850° C. in a high-vacuum oven.

The component produced in this manner was subjected to a thermal/mechanical cyclical stress test. During a heat-up period of 1 min, the component was heated to 500° C. under high vacuum and was then cooled during 15 min to room temperature. After 100 cycles, the component was tested in a non-destructive and a destructive manner, which showed the perfect condition of the soldered connection.

EXAMPLE 2

A diverter plate for fusion reactors according to the "flat-tile design" was produced as follows:

A square-section specimen made of AISI 316 L steel with 21 mm edge size, 150 mm length and a central bore of 14 mm in diameter was milled off on its surface, in order to produce a peak-to-valley height $R_a$ of about 1.6 micra and a flatness of <0.05 mm.

On one side of the square-section tube there was applied a congruent metal-sheet strip with a thickness of 2 mm, made of sheet metal of a 50 chromium 50 nickel alloy. The surface of the sheet metal had been previously ground. Subsequently four pieces of quadrangular graphite blocks 10 mm thick of CFC quality were degassed for 60 minutes under high vacuum at 110° C. $10^{-5}$ mbar.

Using a solder foil of 70 Ag 27 Cu 3 Ti, the graphite blocks were applied in congruent fashion, directly abutting against each other, on the sheet metal made of the 50 chromium 50 nickel alloy, and the composite was soldered in the high-vacuum oven at 860° C.

The component was subjected to the same cyclic stress as the component produced according to Example 1. Here again, a non-destructive and a destructive test of the component showed the perfect condition of the solder connection.

What is claimed:

1. A component with a high heat load-carrying capacity comprising a graphite part and metal part connected to each other by means of a single solder layer, and an intermediate layer arranged between the metal part and the solder layer, the intermediate layer comprising chromium or an alloy containing I significant proportion of at least 20 wt. % chromium at least one material selected from the group consisting of copper and nickel.

2. The component with a high heat load-carrying capacity according to claim 1, wherein the intermediate layer comprises a homogeneous two-phase copper/chromium alloy with at least 20 wt. % chromium and the balance essentially copper.

3. The component with a high heat load-carrying capacity according to claim 2, wherein the alloy comprises 25 wt. % chromium and the balance essentially copper.

4. The component with a high heat load-carrying capacity according to claim 1, wherein the intermediate layer comprises a homogeneous two-phase nickel/chromium alloy with at least 45 wt. % chromium and the balance essentially nickel.

5. The component with a high heat load-carrying capacity according to claim 4, wherein the alloy comprises 50 wt. % chromium and the balance essentially nickel.

6. The component with a high heat load-carrying capacity according to claim 1, wherein the intermediate layer further comprises a structure which increases in chromium content from a zone of pure copper on the side of the metal part to a pure chromium zone on the side which is in contact with the solder layer.

7. The component with a high heat load-carrying capacity according to claim 1, wherein the intermediate layer further comprises a structure which increases in chromium content from a zone of pure nickel on the side of the metal part to a pure chromium zone on the side which is in contact with the solder layer.

8. The component with a high heat load-carrying capacity according to claim 1, wherein the intermediate layer has a thickness between 0.5 mm and 2 mm.

9. The component with a high heat load-carrying capacity according to claim 1, wherein the graphite part comprises fiber-reinforced graphite and the metal part is selected from the group consisting of copper, copper alloy and steel.

10. The component with a high heat load-carrying capacity according to claim 9, wherein the solder layer comprises a material composition of 70 Ag 27 Cu 3 Ti.

11. The component with a high heat load-carrying capacity according to claim 1, wherein the metal part comprises a tungsten/copper or molybdenum/copper composite material.

12. The component with a high heat load-carrying capacity according to claim 2, wherein the intermediate layer has a thickness between 0.5 mm and 2 mm.

13. The component with a high heat load-carrying capacity according to claim 2, wherein the graphite part comprises fiber-reinforced graphite and the metal part is selected from the group consisting of copper, copper alloy and steel.

14. The component with a high heat load-carrying capacity according to claim 13, wherein the solder later comprises a material composition of 70 Ag 27 Cu 3 Ti.

15. The component with a high heat load-carrying capacity according to claim 2, wherein the metal part comprises a tungsten/copper or molybdenum/copper composite material.

16. The component with a high heat load-carrying capacity according to claim 3, wherein the intermediate layer has a thickness between 0.5 mm and 2 mm.

17. The component with a high heat load-carrying capacity according to claim 3, wherein the graphite part comprises fiber-reinforced graphite and the metal part is selected from the group consisting of copper, copper alloy and steel.

18. The component with a high heat load-carrying capacity according to claim 17, wherein the solder later comprises a material composition of 70 Ag 27 Cu 3 Ti.

19. The component with a high heat load-carrying capacity according to claim 3, wherein the metal part comprises a tungsten/copper or molybdenum/copper composite material.

20. The component with a high heat load-carrying capacity according to claim 4, wherein the intermediate layer has a thickness between 0.5 mm and 2 mm.

21. The component with a high heat load-carrying capacity according to claim 4, wherein the graphite part comprises fiber-reinforced graphite and the metal part is selected from the group consisting of copper, copper alloy and steel.

22. The component with a high heat load-carrying capacity according to claim 21, wherein the solder layer comprises a material composition of 70 Ag 27 Cu 3 Ti.

23. The component with a high heat load-carrying capacity according to claim 4, wherein the metal part comprises a tungsten/copper or molybdenum/copper composite material.

24. The component with a high heat load-carrying capacity according to claim 5, wherein the intermediate layer has a thickness between 0.5 mm and 2 mm.

25. The component with a high heat load-carrying capacity according to claim 5, wherein the graphite part comprises fiber-reinforced graphite and the metal part is selected from the group consisting of copper, copper alloy and steel.

26. The component with a high heat load-carrying capacity according to claim 24, wherein the solder layer comprises a material composition of 70 Ag 27 Cu 3 Ti.

27. The component with a high heat load-carrying capacity according to claim 5, wherein the metal part comprises a tungsten/copper or molybdenum/copper composite material.

28. The component with a high heat load-carrying capacity according to claim 6, wherein the intermediate layer has a thickness between 0.5 mm and 2 mm.

29. The component with a high heat load-carrying capacity according to claim 6, wherein the graphite part comprises fiber-reinforced graphite and the metal part is selected from the group consisting of copper, copper alloy and steel.

30. The component with a high heat load-carrying capacity according to claim 28, wherein the solder layer comprises a material composition of 70 Ag 27 Cu 3 Ti.

31. The component with a high heat load-carrying capacity according to claim 6, wherein the metal part comprises a tungsten/copper or molybdenum/copper composite material.

32. The component with a high heat load-carrying capacity according to claim 7, wherein the intermediate layer has a thickness between 0.5 mm and 2 mm.

33. The component with a high heat load-carrying capacity according to claim 7, wherein the graphite part comprises fiber-reinforced graphite and the metal part is selected from the group consisting of copper, copper alloy and steel.

34. The component with a high heat load-carrying capacity according to claim 32, wherein the solder layer comprises a material composition of 70 Ag 27 Cu 3 Ti.

35. The component with a high heat load-carrying capacity according to claim 7, wherein the metal part comprises a tungsten/copper or molybdenum/copper composite material.

36. The component with a high heat load-carrying capacity according to claim 8, wherein the graphite part comprises fiber-reinforced graphite and the metal part is selected from the group consisting of copper, copper alloy and steel.

37. The component with a high heat load-carrying capacity according to claim 35, wherein the solder layer comprises a material composition of 70 Ag 27 Cu 3 Ti.

38. The component with a high heat load-carrying capacity according to claim 8, wherein the metal part comprises a tungsten/copper or molybdenum/copper composite material.

* * * * *

UNITED STATES PATENT AND TRADEMARK OFFICE
CERTIFICATE OF CORRECTION

PATENT NO. : 5,580,670
DATED : December 3, 1996
INVENTOR(S) : Grill, et al.

It is certified that error appears in the above-indentified patent and that said Letters Patent is hereby corrected as shown below:

Column 4,

In claim 1, line 2, after "and", insert --a--.
In claim 1, line 6, after "containing", delete "1 significant proportion of".
In claim 1, line 7, after "chromium", add --with--.
In claim 14, line 2, delete "later" and add --layer--.
Col. 5, In claim 18, line 2, delete "later" and add --layer--.

Signed and Sealed this

Twenty-fifth Day of February, 1997

Attest:

BRUCE LEHMAN

*Attesting Officer*          *Commissioner of Patents and Trademarks*